Oct. 29, 1957    H. L. MORRILL ET AL    2,811,199

AUTOMOBILE SEAT

Filed Nov. 15, 1956

INVENTOR.
HARRY L. MORRILL, JR.
BY KENWAY, JENNEY, WITTER & HILDRETH

ATTORNEYS

United States Patent Office 2,811,199
Patented Oct. 29, 1957

2,811,199
AUTOMOBILE SEAT

Harry L. Morrill, Jr., Marietta, Ga.

Application November 15, 1956, Serial No. 622,462

3 Claims. (Cl. 155—182)

This invention relates to an automobile seat which permits the driver or an occupant readily to get into and out of the front seat without difficulty or discomfort. Numerous attempts have heretofore been made to provide a practical device for accomplishing this end, but most of these attempts have involved a built-in rotatable seat or section, comparable to a turntable. Such devices require a releasable latch and are not only expensive to manufacture and install, but furthermore are relatively uncomfortable in that a full inner spring construction cannot be used because of the space requirements of the rotatable supporting structure.

The principal objects of the present invention are to provide a seat of the aforementioned type which is readily attachable to and detachable from a conventional automobile seat, to provide a seat which does not interfere with the comfort of the driver or occupant and which does not detract from the appearance of the upholstery, and to provide a seat which is of strong and durable construction and which may be manufactured at a relatively low cost.

Figure 1:
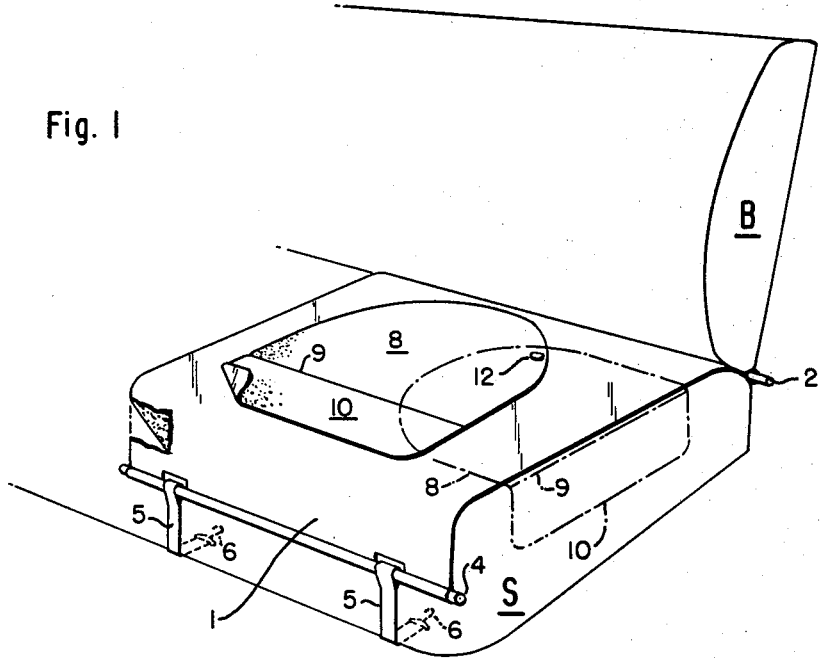
Figure 2:
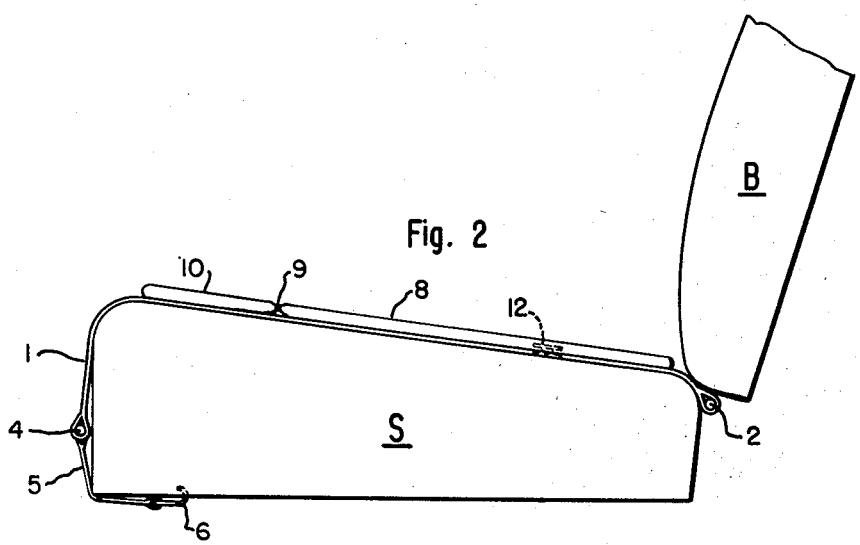

Further objects relate to various features of construction and will be apparent from a consideration of the following description and accompanying drawings wherein:

Fig. 1 is a perspective view of the driver's seat of an automobile having a seat structure made in accordance with the present invention, and Fig. 2 is a side elevation of the seat shown in Fig. 1.

In accordance with the present invention my seat structure comprises a flexible cover member shaped to fit that part of the front automobile seat constituting either the driver's or the occupant's seat, and the front and rear portions of the cover member are provided with any suitable means by which they may be detachably secured in fixed position to the automobile seat. Superposed on this cover member is a seat pad comprising a body portion and a front flap hinged to the pad, both of which are disposed within the confines of the cover member when in driving or normal seating position. The body portion of the seat pad is secured to the cover member at a point remote from the flap, so that the entire pad may be slid and/or rotated to an exit position wherein the front flap drops downwardly into juxtaposition with the outer side of the automobile seat, thereby tending to hold the pad against accidental turning or displacement.

Both the cover member and pad may be of any conventional textile material, whether woven, knitted or felted, or they may be of a suitable flexible sheet material such as leather, plastic or the like, or a combination of these materials, and a color or color combination harmonizing with the upholstery of the car seat. In any case the contacting surfaces of the pad and cover member are relatively smooth or slick so that no objectionable resistance is encountered when the pad is moved on the cover member, and the undersurface of the latter is preferably rough, or provided with a friction surface tending to grip the surface of the automobile seat, thereby resisting relative movement. The connection between the pad and cover member may be in the form of a snap fastener, tubular rivet, tape, cord or the like which will permit the pad to slide and/or swing from riding or driving position to exit position.

Referring to the accompanying drawing, the particular embodiment shown therein comprises a flexible cover member 1 which may be of generally rectangular shape and a size which will either fit the driver's seat or that of the occupant, it being understood that the front seat S may be of conventional design and construction. The rear edge portion of the cover member 1 is formed with a seam which receives a dowel or rod 2 appropriately anchored in the opening between the base of the back B and the rear of the seat S, and the front edge of the cover member is also formed with a seam which receives a dowel 4. The ends of the pair of spaced elastic straps 5 are suitably secured to the dowel 4 and these straps extend downwardly about the front wall of the seat and then inwardly. The ends of the straps carry snap hooks 6 which are detachably secured to the frame or spring of the seat S and the straps are so tensioned as to hold the cover member 1 taut.

The cover member may be made of a hard satin twill or any of the above-mentioned sheet materials which provides a slick upper surface, and if desired the undersurface of the cover member may be coated with a suitable rug stay, a thin layer of latex foam rubber or the like material which grips the surface of the seat S and cooperates with the anchor straps in holding the cover member firmly in position.

Disposed on the cover member is a pad 8, the body portion of which may be of generally semi-elliptical shape and the straight front edge of this pad is provided with a hinge 9 which carries a generally rectangular shaped flap 10, the combined area of the body of the pad 8 and the flap 10 being less than that of the cover member so that when the pad is in driving or normal seating position, shown by the full lines of Fig. 1, it is entirely within the confines of the cover member. This pad may be a single thickness of sheet material or the aforementioned type, or a double thickness with an interposed layer of appropriate cushioning material or padding, but in either case its under surface has a smooth finish similar to that of the contacting surface of the cover member. The upper face of the pad may be of any wear-resisting material which is preferably sufficiently smooth to permit the driver or occupant easily to slide on and off the pad.

The pad 8 is rotatably connected to the cover by a snap fastener, hollow rivet or the like pivot 12 so that it may readily swing through a 90° arc to exit position, shown by the dot and dash lines of Fig. 1, wherein the flap 10 drops downwardly into juxtaposition with the side wall of the seat S and to this end the location of the pivot 12 is necessarily off center, i. e., remote from the hinge 9, its particular location depending upon the front to rear length of the body of the pad. The particular design of the pad here shown is such that the pivot 12 is carried by its curved marginal portion remote from the hinge 9. When in exit position the pivot 12 serves to prevent the pad from falling out of the car and the depending flap 10 cooperates with the pivot 12 in preventing accidental displacement.

It will be observed that since the cover member and pad are flexible they do not impede the normal spring action of the seat S and hence do not interfere with the comfort of the occupant or driver. Moreover, the occupant or driver when seated on the pad may readily swing it to and from exit position and when swung to exit position the legs of the occupant or driver hang over the side of the car and hence assure safety in alighting.

It will also be noted that when the pad is in exit position it is not displaced by the opening and closing of the car door, and when the driver or occupant re-enters the car he first sits on the pad and then swings to driving or normal seating position, thus avoiding the difficulties usually encountered in entering the front seat of an automobile.

It is to be understood that this disclosure is for the purpose of illustration and that various changes and modifications may be made without departing from the spirit and scope of the invention as set forth in the appended claims.

I claim:

1. A seat construction for attachment to the front seat of an automobile, comprising a flexible cover member shaped to fit over the surface of the automobile seat, means at the front and rear portions of said cover member for anchoring it in fixed position on the automobile seat, a seat pad superposed on said cover member, said seat pad having a body portion and a front flap hinged to said body portion, and means carried by said body portion for securing it to said cover member at a point remote from said flap, said pad being movable from a driving position, wherein the pad is within the confines of said cover member, to an exit position, wherein said flap drops downwardly into juxtaposition with the outer side of the automobile seat.

2. A seat construction for attachment to the front seat of an automobile, comprising a flexible cover member shaped to fit over the surface of the automobile seat, means at the front and rear portions of said cover members for anchoring it in fixed position on the automobile seat, a seat pad superposed on said cover member, said seat pad having a body portion and a front flap hinged to said body portion, and means carried by said body portion for rotatably securing it to said cover member at a point remote from said flap, the contacting surfaces of said pad and cover member being smooth so that said pad may be rotated from a driving position, wherein the pad is within the confines of said cover member, to an exit position, wherein said flap drops downwardly into juxtaposition with the outer side of the automobile seat.

3. A seat construction for attachment to the front seat of an automobile, comprising a flexible cover member shaped to fit over a part of the upper surface of the automobile seat, means at the front and rear portions of said cover member for anchoring it in fixed position on the automobile seat, a seat pad superposed on said cover member, said seat pad having a semi-elliptical body portion and a front flap hinged to said body portion, and means carried by said body portion at a point on its curved margin remote from said flap for rotatably securing said pad and flap to said cover member, said pad being rotatable from a driving position, wherein the pad is within the confines of said cover member, to an exit position, wherein said flap drops downwardly into juxtaposition with the outer side of the automobile seat.

References Cited in the file of this patent

UNITED STATES PATENTS

| | | |
|---|---|---|
| 1,444,521 | Pearl | Feb. 6, 1923 |
| 2,791,268 | Mendelsohn | May 7, 1957 |